US009189746B2

(12) United States Patent
Zhu et al.

(10) Patent No.: US 9,189,746 B2
(45) Date of Patent: Nov. 17, 2015

(54) MACHINE-LEARNING BASED CLASSIFICATION OF USER ACCOUNTS BASED ON EMAIL ADDRESSES AND OTHER ACCOUNT INFORMATION

(75) Inventors: Bin Benjamin Zhu, Edina, MN (US); Fei Xue, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 450 days.

(21) Appl. No.: 13/349,306

(22) Filed: Jan. 12, 2012

(65) Prior Publication Data
US 2013/0185230 A1      Jul. 18, 2013

(51) Int. Cl.
| | |
|---|---|
| G06F 21/00 | (2013.01) |
| G06F 15/18 | (2006.01) |
| G06F 15/16 | (2006.01) |
| G06N 99/00 | (2010.01) |
| G06Q 10/10 | (2012.01) |
| H04L 12/58 | (2006.01) |
| G06F 21/31 | (2013.01) |

(Continued)

(52) U.S. Cl.
CPC .............. *G06N 99/005* (2013.01); *G06F 21/31* (2013.01); *G06F 21/41* (2013.01); *G06F 21/552* (2013.01); *G06Q 10/107* (2013.01); *H04L 51/12* (2013.01); *G06F 2221/2113* (2013.01); *G06F 2221/2117* (2013.01)

(58) Field of Classification Search
CPC ... G06N 99/005; G06N 5/025; G06Q 10/107; G06F 15/16; G06F 15/18; G06F 21/00
USPC ............ 726/22, 4, 21, 26; 706/12, 13, 20, 52; 709/204, 206, 223, 224
See application file for complete search history.

(56) References Cited

U.S. PATENT DOCUMENTS 6,092,197 A * 7/2000 Coueignoux ................... 726/21
7,305,445 B2  12/2007 Singh et al.
(Continued)

FOREIGN PATENT DOCUMENTS

| | | |
|---|---|---|
| EP | 2112627 | 10/2009 |
| JP | 2004139536 | 5/2004 |

OTHER PUBLICATIONS

Youn S., et al., "A Comparative Study for Email Classification", Advances and Innovations in Systems, Computing Sciences and Software Engineering, pp. 387-391, 2007.*

(Continued)

*Primary Examiner* — Stanley K Hill
*Assistant Examiner* — Dave Misir
(74) *Attorney, Agent, or Firm* — Sandy Swain; Judy Yee; Micky Minhas (57) ABSTRACT

A trust level of an account is determined at least partly based on a degree of the memorability of an email address associated with the account. Additional features such as those based on the domain of the email address and those from the additional information such as name, phone number, and address associated with the account may also be used to determine the trust level of the account. A machine learning process may be used to learn a classification model based on one or more features that distinguish a malicious account from a benign account from training data. The classification model is used to determine a trust level of the account, and/or if the account is malicious or benign, and may be continuously improved by incrementally adapting or improving the model with new accounts.

19 Claims, 4 Drawing Sheets

(51) Int. Cl.
*G06F 21/41* (2013.01)
*G06F 21/55* (2013.01)

(56) References Cited

U.S. PATENT DOCUMENTS

| | | | |
|---|---|---|---|
| 7,546,349 | B1 | 6/2009 | Cooley |
| 7,788,195 | B1* | 8/2010 | Subramanian et al. ......... 706/20 |
| 8,095,606 | B1 | 1/2012 | Wiley et al. |
| 8,402,548 | B1* | 3/2013 | Muriello et al. ................ 726/26 |
| 2005/0246420 | A1* | 11/2005 | Little, II ........................ 709/204 |
| 2005/0262209 | A1 | 11/2005 | Yu |
| 2006/0041621 | A1 | 2/2006 | Libbey |
| 2006/0059004 | A1 | 3/2006 | Ussery et al. |
| 2006/0095521 | A1* | 5/2006 | Patinkin ........................ 709/206 |
| 2006/0200487 | A1 | 9/2006 | Adelman et al. |
| 2007/0299920 | A1 | 12/2007 | Crespo et al. |
| 2008/0097942 | A1* | 4/2008 | Zhao et al. ....................... 706/13 |
| 2009/0148010 | A1* | 6/2009 | Boroczky et al. ............. 382/128 |
| 2010/0063948 | A1* | 3/2010 | Virkar et al. .................... 706/12 |
| 2011/0035789 | A1* | 2/2011 | Callahan et al. ................. 726/4 |
| 2011/0055122 | A1* | 3/2011 | Andreoli ......................... 706/12 |
| 2012/0209970 | A1* | 8/2012 | Scipioni et al. ................ 709/223 |
| 2013/0060708 | A1* | 3/2013 | Oskolkov et al. ............... 705/75 |
| 2013/0173457 | A1* | 7/2013 | Chrapko et al. ................ 705/39 |

OTHER PUBLICATIONS

Dumais, "Using SVMs for Text Categorization," Proceedings of IEEE Intelligent Systems, Eds: Trends and Controversies, Support Vector Machines, Volume No. 13, Issue No. 4, 1998, retrieved at <<http://research.microsoft.com/en-us/um/people/sdumais/ieee98-tc.doc>>, pp. 21-23.

Minkov et al., "Extracting Personal Names from Email: Applying Named Entity Recognition to Informal Text," HLT '05 Proceedings of the conference on Human Language Technology and Empirical Methods in Natural Language Processing, Oct. 6-8, 2005, retrieved at <<http://www.cs.cmu.edu/~einat/HLT-EMNLP-05.pdf>>, pp. 443-450.

The European Office Action mailed May 8, 2015 for European patent application No. 13735613.5, a counterpart foreign application of U.S. Appl. No. 13/349,306, 5 pages.

The Supplementary European Search Report mailed Apr. 22, 2015 for European Patent Application No. 13735613.5, 3 pages.

The PCT Search Report and Written Opinion mailed Apr. 30, 2013 for PCT application No. PCT/US2013/020714, 10 pages.

* cited by examiner

MACHINE-LEARNING BASED CLASSIFICATION OF USER ACCOUNTS BASED ON EMAIL ADDRESSES AND OTHER ACCOUNT INFORMATION

BACKGROUND

Online transactions usually require online accounts. Each online account contains information related to the user of account, such as email address, name, home address, phone numbers, etc. To avoid being caught and increase success rate, malicious users usually use an account for illegal usage for a short time and then switch to another account, thereby needing a lot of accounts. The accounts used for illegal transactions may be compromised accounts of other legitimate users, or may be created by the malicious users. Automatic programs (i.e., bots) may be used to generate a large amount of email addresses to register such fraudulent accounts. For example, such fraudulent accounts may be associated with some stolen or illegal credit cards to make fraudulent transactions online. The information associated with an account, such as the associated email address, is reviewed manually for identification of malicious accounts, which is costly, labor intensive, and time consuming.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the present disclosure.

The present disclosure provides techniques to identify whether an incoming account is malicious at least partly based on information including an email address and/or other additional information associated with the account. The techniques extract features from the information associated with the account, and apply a classification model to generate a score based on the extracted features to indicate how likely the incoming account is malicious. Such score may be at least partly determined by a degree of memorability of the email address. The memorability refers to an easiness to memorize the email address by a person. The degree of memorability may be determined by using one or more features that distinguish a human-generated email address from a machine-generated email address to generate a degree of memorability of the email address. In addition, the score may be also partly determined by the domain of the email address, and may be based on other additional information related to the account such as correlation of the email address with other account information such as name, telephone and address to assist in determining whether the account is malicious. For example, the score may also be partly determined by information other than an email address that is associated with an account, such as if the account name, address, etc. matches those of a credit card, validity of an address, how long the account has been created, and etc.

The present techniques apply machine learning to learn one or more features extracted from training data that distinguish a malicious account from a benign accounts, obtain the classification model based on the features, and use the classification model to automatically determine the score indicating how likely the incoming account is malicious. The classification model may be improved continuously and trained incrementally with new data. For example, the ground truth of the incoming account that whether the incoming account is malicious or benign, which may be obtained from the result of one or more online transactions, may feed to train the classification model to adjust the classification model accordingly. For instance, the ground truth of the incoming account may be compared with a result determined by the classification model and such comparison result is used to improve the classification model.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present techniques determine a score of an account associated with an email address and other account information at least partly based on the degree of memorability of the email address. The score determines how likely the account is malicious or benign. In addition, the techniques may also use other features associated with the account and/or the email address, such as the domain of the email address, correlation of the phone number and user name associated with the account and/or the email address, or other features associated with the account to determine a score of the account.

The email address associated with a benign account is usually human-generated while the email address associated with a malicious account may usually be machine-generated. Human-generated email addresses are typically selected for easy memorization for a period of time. There are typically certain features such as meaningful strings and numbers, pronounceable strings, symmetry in the human-generated email addresses to help memorization. Their lengths are also typically short. The current machine-generated email addresses typically lack these features. In some embodiments, some email addresses may pass the test of memorability and be deemed human-generated, but may still be deemed being associated with malicious accounts if their domains or other additional information associated with the email address and/or the account are determined to be associated with malicious accounts. In other embodiments, account data other than an email address such as the name associated with the account and its correlation with the name of a credit card used in an online transaction, validity of an address associated with the account, etc. may also be used to determine likelihood the account is malicious or not.

Machine-learning techniques may be used to extract features from training data to distinguish malicious accounts from benign accounts, and to generate a classification model to determine a score on likelihood that the account is malicious. In one embodiment, there may be two stages to obtain the classification model. A first stage is supervised learning where the training data is used to learn a classification model based on identification of a set of features extracted from the training data that distinguish malicious accounts from benign accounts at least based on the memorability of the email addresses included in the training data. A second stage is to use the classification model to determine if an incoming account is malicious. These two stages may be operated sequentially or in an interleaving manner where additional data is collected to incrementally train the classification model. For example, a ground truth of an account is compared with the result of automatic determination by the classification model, and is subsequently used to train the classification model. Such ground truth of the account may be determined by the result of one or more online transactions to find that the account is malicious or benign. For example, a credit card associated with the account is rejected by the bank. Such ground truth of the account may also be determined by a reviewer such as a person.

Figure 1:
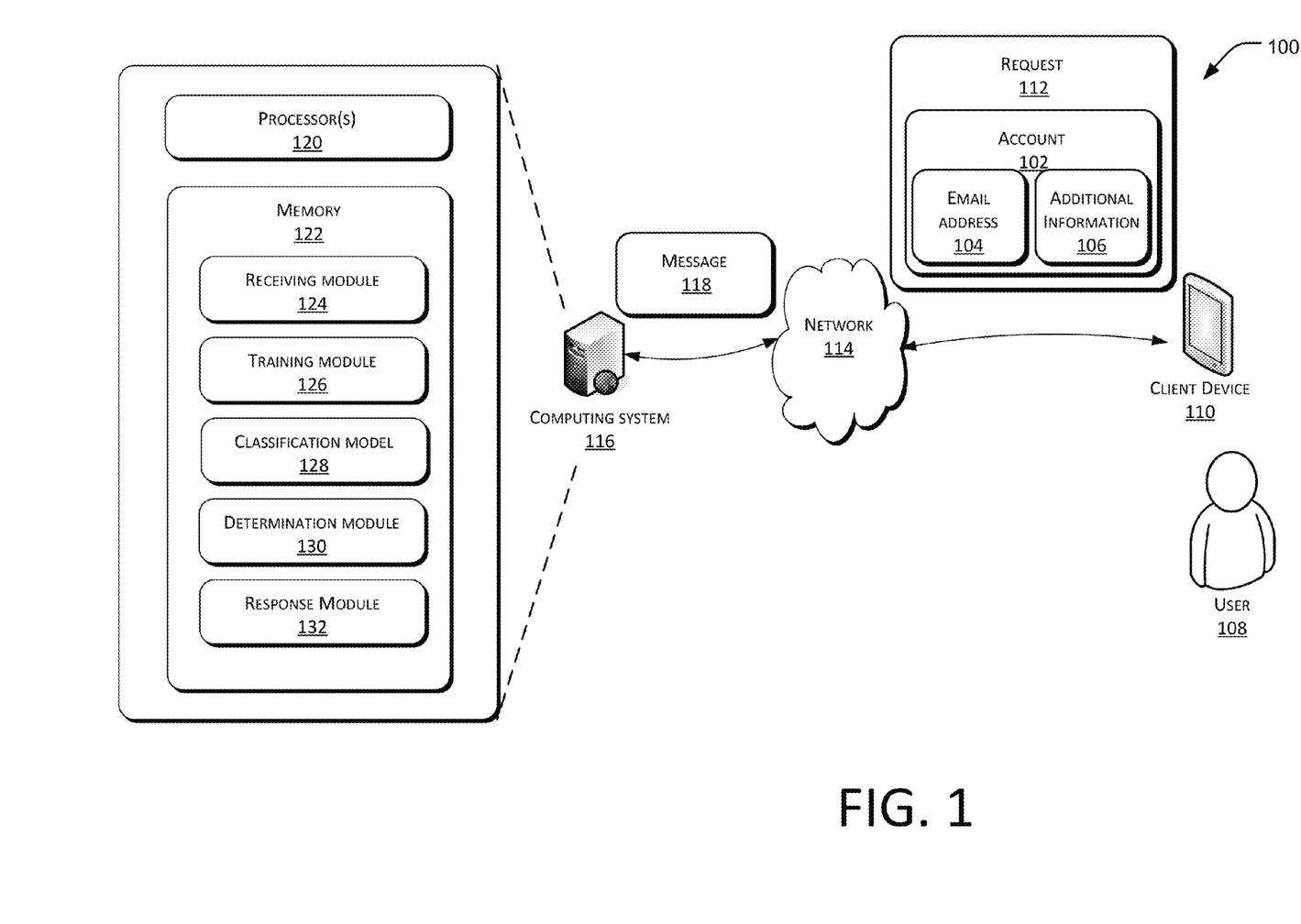
FIG. 1 illustrates an example scenario of determining a score of an account based on the account's email address and other additional information.

FIG. 1 illustrates an example scenario 100 of determining the likelihood that an account 102 is malicious. The account 102 associates with an email address 104 and additional information 106. A user 108 uses a client device 110 to send a request 112 for services such as online payment or account registration (not shown) through a network 114 to a computing system 116. The request 112 associates with the account 102 and may include information of the account 102 such as the email address 104 and additional information 106. The account 102 and its associated email address 104 may be used as identification of the request 112 or the user 108. Before the services are available to the user 108, a computing system 116 determines the likeliness that the account 102 is malicious at least partly based on the degree of memorability of the email address 104. The memorability refers to an easiness to memorize the email address 104 by a person. The computing system 116 may also send a message 118 to the client device 110 to inform the determination result. If the account 102 is deemed benign, the services will be provided to the user 108. Otherwise, the services will be withheld and the request 112 is rejected.

The computing system 116 may also use additional features associated with the email address 104, such as domain of the email address 104 and features associated with additional information 106 of the account 102 such as phone number, user name, address, and etc., to determine the likelihood that the account 102 is malicious. Such additional information 106 may be associated with the account 102 and is included in the request 112 as shown in FIG. 1. Alternatively, the additional information 106 may be searched, obtained, and checked by the computing system 116 through one or more local and remote databases or at the internet. For example, the computing system 116 may use the email address 104 as a keyword to search the additional information 106.

The computing system 116 includes one or more processors 120, and memory 122. Any number of program modules, applications, or components can be stored in the memory, including by way of example, an operating system, one or more applications, other program modules, program data, computer-executable instructions. In the example of FIG. 1, there is a plurality of modules stored on the memory 122. The modules may include a receiving module 124, a training module 126, a classification model 128, a determination module 130, and a response module 130.

The receiving module 124 receives the request 112 associated with the account 102 which contains the email address 104 and/or the additional information 106, if any, that associated with the account 102.

The training module 126 uses one or more labeled data as training data to learn a classification model 128 based on one or more features that distinguish a malicious account from a benign account. For example, the labeled data may include a plurality of accounts that are already labeled as malicious or benign account from one or more data sources such as databases. The training module 126 analyzes the email addresses and additional information associated with the accounts from the labeled data, extracts one or more features that distinguish a malicious account from a benign account from the email address and/or the additional information. Such features may include one or more features that determine memorability of the email addresses.

In some embodiments, the one or more features may be based on the domains of the email addresses. In other embodiments, the one or more features may be based on correlation of the email address with name, address, phone number, etc. in the additional information. In yet other embodiments, the one or more features may be partly based on the additional information, for example, validity of the name, address, or phone number, correlations between the name of the account and the name of a credit card used in an online transaction. The training module 126 learns the classification model 128 based on the obtained features by using one or more machine learning methods. For example, the one or more learning methods include support vector machine (SVM). The training module 126 may continuously train the classification model 128 based on new data.

The classification model 128 includes one or more features that distinguish a malicious account from benign account. The classification model 128 may also include formats of the features, the corresponding threshold value of each feature that determines whether accounts associate with certain email addresses and/or additional information are benign or malicious, and weight of each feature or a function of the features in determining that a respective account is malicious.

The determination module 130 uses the classification model 128 to determine a score to indicate how likeliness of the account 102 is malicious. For example, the determination module 128 may parse and extract features from the email address 104 and the additional information 106 according to preset formats required by the classification model 128, apply classification model 128 to the features of the account 102, and determine a score to indicate how likely the account 102 is malicious. There are various methods of the determination. For example, the computing system 116 may calculate a score to indicate the likelihood that the account 102 is malicious based on various feature values extracted from the email address 104 and/or the additional information 106. If the score is higher than a preset threshold, the account 102 is deemed as a malicious account and the computing system 116 rejects the requested service by the user 108. If the score is lower than the same or a different preset threshold, the account 102 is deemed as a benign account and the computing system 116 provides the requested service. Alternatively, one or more of the features may be set as a decisive test. If the feature values of the account 102 for such features are in a preset range or ranges or fail to meet one or more thresholds of the decisive test, the account 102 is determined as malicious regardless its feature values for other features. For example, if the domain of the email address 104 or the additional information 116 associated with the account 102 is listed in one or more blacklists (not shown), the account 102 is deemed malicious.

The response module 132 returns the message 118 including the result of the determination module 130 to the client device 110.

The computing system 116 may have different configurations and modules in various embodiments. In another embodiment (not shown in FIG. 1), the computing system 116 may not need to analyze the labeled data and may not have the training module 126. The classification model 128 may be preconfigured with the features already pre-stored at the computing system 116.

Memory 122 may include volatile memory, non-volatile memory, removable memory, non-removable memory, and/or a combination of any of the foregoing. Generally, memory 122 contains computer executable instructions that are accessible and executable by the one or more processors 120. The memory 122 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computing system 116 may be the same as, or independent from, the computing system that provides the online service. In some embodiments, the computing system 116 may also relay the request 112 to another computing system (not shown) to determine the likelihood that the account 102 is malicious.

The computing system 116 is only one example and is not intended to suggest any limitation as to the scope of use or functionality of the computer and network architectures. For the sake of convenient description, the above system is functionally divided into various modules which are separately described. When implementing the disclosed system, the functions of various modules may be implemented in one or more instances of software and/or hardware.

The client device 110 or the computing system 116 may be used in an environment or in a configuration of universal or specialized computer systems. Examples of the client device 110 or the computing system 116 may include a personal computer, a server computer, a handheld device or a portable device, a tablet device, a multi-processor system, a microprocessor-based system, a set-up box, a programmable customer electronic device, a network PC, and a distributed computing environment including any system or device above.

In the distributed computing environment, a task is executed by remote processing devices which are connected through a communication network. In the distributed computing environment, the modules may be located in computer storage media (which include data storage devices) of local and remote computers. For example, some or all of the above modules such as the receiving module 124, the training module 126, the classification module 128, the determination module 130, and the response module 132 may be located the memory 122 at different locations. Some modules may be separate systems and their processing results can be used by the computing system 116.

Exemplary methods for performing techniques described herein are discussed in details below. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

For convenience, the methods are described below in the context of the computing system 116 and environment of FIG. 1. However, the methods are not limited to implementation in this environment.

Figure 2:
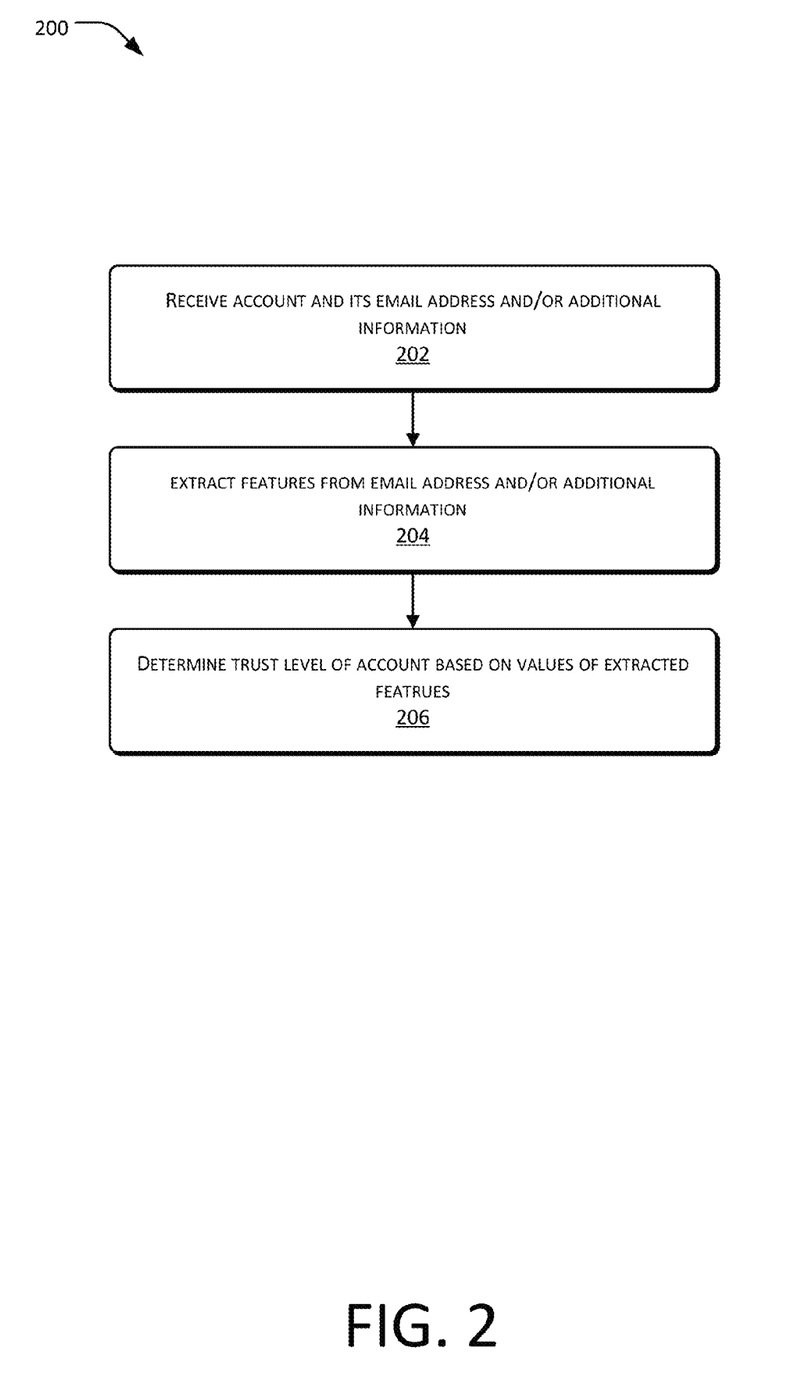
FIG. 2 illustrates a flowchart of an example method for determining a score of an account.

The exemplary methods are illustrated as a collection of blocks in a logical flow graph representing a sequence of operations that can be implemented in hardware, software, firmware, or a combination thereof Unless expressly stated otherwise, the order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations FIG. 2 illustrates a flowchart of an example method for determining if the account 102 is malicious based on one or more features of the email address 104 and/or the additional information 106 associated with the account 102.

At 202, the computing system 116 receives the account 102 and information associated with the account 102 including its email address 104 and/or additional information 106. At 204, the computing system 116 extracts features from the information such as the email address 104 and additional information 106 associated with the account 102. At 206, the computing system 116 determines a trust level of the account 102 based on the values of the extracted features.

For example, the computing system 116 may parse the email address 104 according to one or more features that determines the degree of memorability of the email address 104, and obtain the corresponding feature values of the email address 104. The one or more features may comprise features related to meaningful strings, features related to pronounceable strings, features related to lengths of numbers and their positions in the email address, features related to a pattern including symmetry or anti-symmetry of neighboring strings, or uniformly distanced characters in the email address. The computing system 116 may calculate a degree of memorability of the email address 104 based on the corresponding feature values. The computing system 116 may also convert one or more characters or numbers to find the meaningful strings according to a preset of rules. For example, the number "2" in the email address 104 may be treated as the characters "to". Some example features and conversion rules are listed in details below.

For another example, the computing system 116 may also parse the email address 104 according to one or more features that relate to the domain of the email address 104, correlation of the email address 104 with data in the additional information 106 such as name, address, phone number. The computing system 116 may parse the additional information 106 according to one or more features that relate to validity of the name, address, phone number, and check the correlation between the additional information 106 of the account 102 with corresponding information of a credit card used in an online transaction. For example, in an even that the credit card is determined as an invalid or malicious credit card such as the credit card is rejected by the bank and one or more of the additional information 106 match corresponding information of the credit card, the account 102 may be determined as malicious.

The features may be pre-stored at the computing system 116 or may be learned by the computing system 116 through the labeled data from one or more sources in a batched manner or a progressive manner. For example, the computing system 116 may analyze multiple labeled accounts and their associated email addresses and/or additional information from one or more sources. Each of the labeled account indicates that a respective labeled account is a malicious account or a benign account. The computing system 116 may learn one or more features that distinguish a malicious account from a benign account by using one or more machine learning methods such as SVM. The one or more features that distinguish a malicious account from a benign account may be extracted from an email address associated with the account at least partly based on the memorization of the email address. The one or more features may also be extracted from an email address based on other information of the email address, such as the domain of the email address, correlation of the email address with the data in the additional information 106. Additionally, the one or more features may be extracted from the additional information 106. The computing system 116 obtains the classification model 128 based on the obtained features; and uses the classification model 128 to calculate a score to indicate the likelihood that the account is malicious.

At 206, the computing system 116 may determines a trust level of the account 101 at least partly based on the determined degree of memorability of the email address 104 associated with the account 102. In one embodiment, the computing system 116 may determine a score based on the calculated degree of memorability of the email address 104. If the calculated score is higher than a preset threshold, the computing system 116 determines that the account 102 is malicious. If the calculated score is lower than the preset threshold, the computing system 116 determines that the account 102 is benign.

In another embodiment, in addition to the degree of memorability of the email address 104 associated with the account 102, the computing system 116 may also determine the likelihood that the account 102 is malicious by considering other features of the email address 104. For example, the computing system 116 may obtain the domain of the email address 104, correlation of the email address 104 with additional information 106 of the account 102 such as user name, phone number, and address. In yet another embodiment, the computing system 116 may also determine the likelihood that the account 102 is malicious by considering one or more features from the additional information 106 of the account 102. For example, the computing system 116 may determine a distance that a name associated with the account 102 from a real name, a distance of the address from a valid address, correlation of the phone and address, correlation of the name, address, and phone associated with the account with a credit card that was/is used in one or more online transactions associated with the account 102. Such additional information 106 may be provided by the user 108 and sent to the computing system 116 together with the email address 104 previously, such as in registering the account, or in the request 112. Alternatively, the computing system 116 may use some searching techniques to use the account 102 and/or the email address 104 as a keyword to search online or from one or more databases to find the additional information 106 associated with the account 102. The computing system 116 may receive or use some searching techniques to find information used to extract features from the email address 104 and/or the additional information 106.

The computing system 106 may calculate a trust level of the domain of the email address 104 and additional information 106 respectively.

For example, the computing system 106 may store four lists including a white list of domains, a black list of domains, a benign list of domains, and a malicious list of domain to determine and record a trust level of the domains. These lists may be preset or based on statistics or calculation of the training data including the labeled data and continuous incoming new labeled data. In some embodiment, the computing system 106 may only store one or more of the four lists.

The computing system 106 may count the number of times that a respective domain is associated with accounts labeled as benign and/or accounts labeled as malicious in the training data and calculates a trust level of the respective domain based on such counts. Alternatively, the computing system 106 may calculate a trust level that the respective domain is associated with benign accounts and a trust level that the respective domain is associated with malicious accounts respectively.

The white list of domains lists the domains that are assumed to be associated with benign accounts. For example, the white list of domains may include domains of trusted companies, schools, or institutions that are preset in the white list. For another example, the white list of domain may also include domains whose trust levels are calculated to be above a threshold such as 100% or 99%. In other words, there are at least 99% or 100% probability that such domains are trustable and are associated with benign accounts.

The black list of domains lists the domains that are assumed to be associated with malicious accounts. For example, the black list of domains may include domains of attackers that are preset in the black list. For another example, the black list of domains may also include domains whose trust levels are calculated to be lower than a threshold such as 0% or 1%. In other words, there is only 0% or 1% probability that such domains are trustable and are therefore of 100% or 99% probability to be associated with malicious accounts.

If the trust level of the respective domain based on the current training data is insufficient to list the respective domain in either the black list or the white list, the respective domain may be listed in the benign list of domains and/or the malicious list of domains. The benign list of domains may include the respective domain and a count of distinct email addresses of such domain associated with accounts labeled as benign by analyzing the training data. The benign list may also include a trust level that the respective domain is associated with accounts labeled as benign by calculation based on such counts. The malicious list of domains may include the respective domain and a count of distinct email addresses of such domain associated with accounts labeled as malicious by analyzing the training data. The malicious list may also include a trust level that the respective domain is associated with malicious accounts by calculation based on such counts.

In one embodiment, the benign list of domains and the malicious list of domains are not exclusive. A domain can be listed in both benign list of domains and malicious list of domains. The trust level or probability that a respective domain is associated with benign account and the trust level or probability that the domain is associated with malicious account may be added to equal 1 or 100%. For example, after sufficient labeled data are collected for the respective domain, the formula to calculate the trust level that the respective domain is associated with benign accounts may be the number of times that the respective domain associated with accounts labeled as benign divided by the total number of times that the respective domain associated with all accounts (including both accounts labeled as benign and accounts labeled as malicious) in the training data. After sufficient labeled data are collected for the respective domain, the formula to calculate the trust level that the respective domain is associated with malicious accounts may be the number of times that the respective domain associated with accounts labeled as malicious divided by the total number of times that the respective domain associated with all accounts (including both accounts labeled as benign and accounts labeled as malicious) in the training data. For example, such sufficiency may be based on a threshold of labeled data has been collected and analyzed for the respective domain.

With a change of the trust level of the respective domain, such domain may be listed in different lists over a period of time.

The computing system 116 may compare the domain and of the email address 104 with those in the white list and/or the black list to further determine if the account 102 associated with the email address 104 is malicious or not. For example, even if the calculated degree of memorability of the email address 104 is higher than the threshold, i.e., the email address is determined to be easy to remember by human, the computing system 116 may still determine that the account 102 that the email address 104 is associated with is malicious if any of the domain of the email address 104 is found in the black list. The computing system 116 may also check the benign list of domains and/or the malicious list of domain to obtain a trust level of the domain.

The computing system 116 may store additional lists of additional information in order to evaluate a trust level of a domain of an email address. For example, similar to the four lists of domains, the computing system 116 may also store four lists including a white list of additional information, a black list of additional information, a benign list of additional information, and a malicious list of additional information to determine and record a trust level of the additional information. As the additional information may include a plurality of items associated with the account such as the name, phone number, physical address, IP address of the source of the request, and etc., the computing system 116 may store such four lists for each of the additional information, such as a white list of phone number, a black list of phone number, a benign list of phone number, and a malicious list of phone number. In some embodiments, the computing system 116 may only store one or more of the four lists. The computing system 116 may also only store the lists for some items in the additional information, such as name and phone number.

Similar to the four lists described above with respect to the domain, the white list of additional information lists the additional information that is assumed to be associated with benign accounts. The black list of domains lists the additional information that is assumed to be associated with malicious accounts. If the trust level of the respective additional information based on the current training data is insufficient to list the respective domain in either the black list or the white list, the respective domain may be listed in the benign list of additional information and/or the malicious list of additional information. The benign list of additional information may include the respective additional information and a count of such additional information associated with accounts labeled as benign by analyzing the training data. The benign list may also include a trust level that the respective additional information is associated with benign accounts by calculation based on such counts. The malicious list of additional information may include the respective additional information and a count of such additional information associated with malicious accounts by analyzing the training data. The malicious list may also include a trust level that the respective additional information is associated with malicious accounts by calculation based on such counts.

Such white list, black list, benign list, and/or malicious list of domains and/or respective additional information may be obtained from one or more sources or input manually. Such malicious list or benign list may be derived from parsing and analyzing of the training data. Alternatively or additionally, such malicious list or benign list may be obtained from a separate source, such as a database independently collect and maintain malicious or benign domains and/or additional information associated with accounts.

Figure 3:
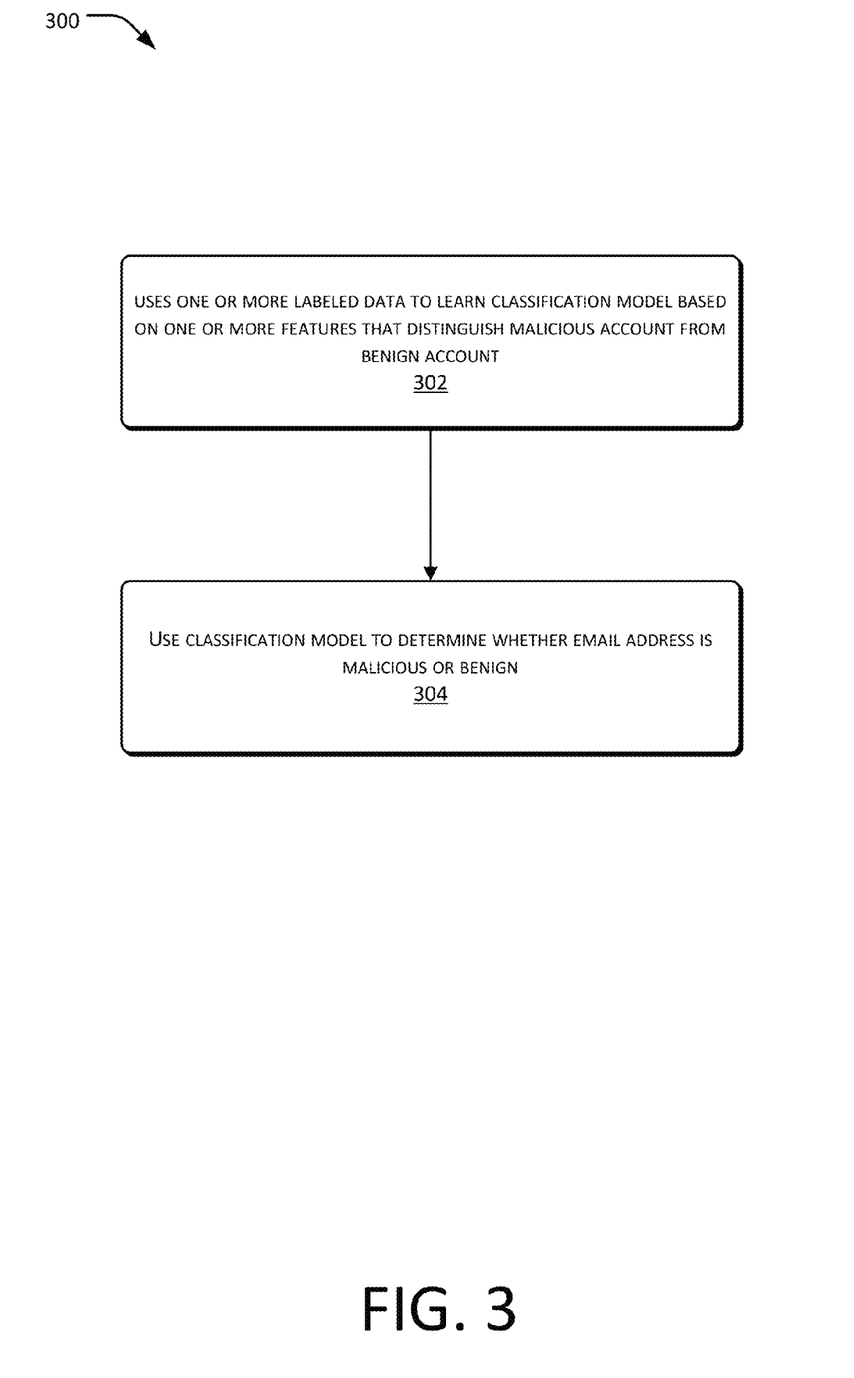
FIG. 3 illustrates a flowchart of an example method for machine-learning to identify features and generate a classification model.

FIG. 3 illustrates a flowchart of an example method 300 of machine-learning techniques that identify features and generate the classification model 128 to determine a trust level of the account 101. In one embodiment, there may be two stages to obtain the classification model.

At 302, the computing system 116 uses one or more labeled data to learn or build the classification model 128 based on one or more features that distinguish a malicious account from a benign account. The one or more labeled data act as the training data including a plurality of labeled accounts associated with email addresses and possibly additional information from one or more sources, such as a malicious account database and a benign account database. Each of the account in the labeled data is labeled as either malicious or benign.

At 304, the computing system 116 uses the classification model to determine a trust level of the account 102. In some embodiments, if the calculated trust level is larger than a preset threshold, the account 102 is determined to be benign. On the other hand, if the calculated trust level of the account is smaller than a preset threshold, which may be the same as or different from the previous preset threshold, the account is determined to be malicious.

Operations at 302 and 304 may be performed sequentially. For example, in a batch learning of the labeled data, the classification model 128 is obtained and used to classify the email address 104.

Alternatively, operations at 302 and 304 may be operated in an interleaving manner and the classification model 128 is improved with a result of the online learning. In addition to the labeled data, additional data such as a new labeled incoming account like the account 102 is used to incrementally train the classification model 128 while the classification model 128 is used in classifying the accounts online. For example, the ground truth of the account 102 may be obtained, and compared with the result determined by the classification model 128. If the ground truth agrees with the result, the classification model 128 and its included features are confirmed. If the ground truth does not agree with the result, the classification model 128 is disconfirmed. New labeled accounts and/or the feedback ground truth of previously determined accounts may be used to incrementally train the classification model 128 and thus the classification model 128 is improved continuously with new training data. For instance, the ground truth of the account 102 may be a result manually reviewed by a human to determine whether the account 102 is malicious or benign.

The computing system 116 may use one or more machine learning techniques to learn the classification model. For example, the machine learning techniques may include a support vector machine (SVM). Both linear and nonlinear SVM such as polynomial or Gaussian Radial Basis Function may be applied.

Figure 4:
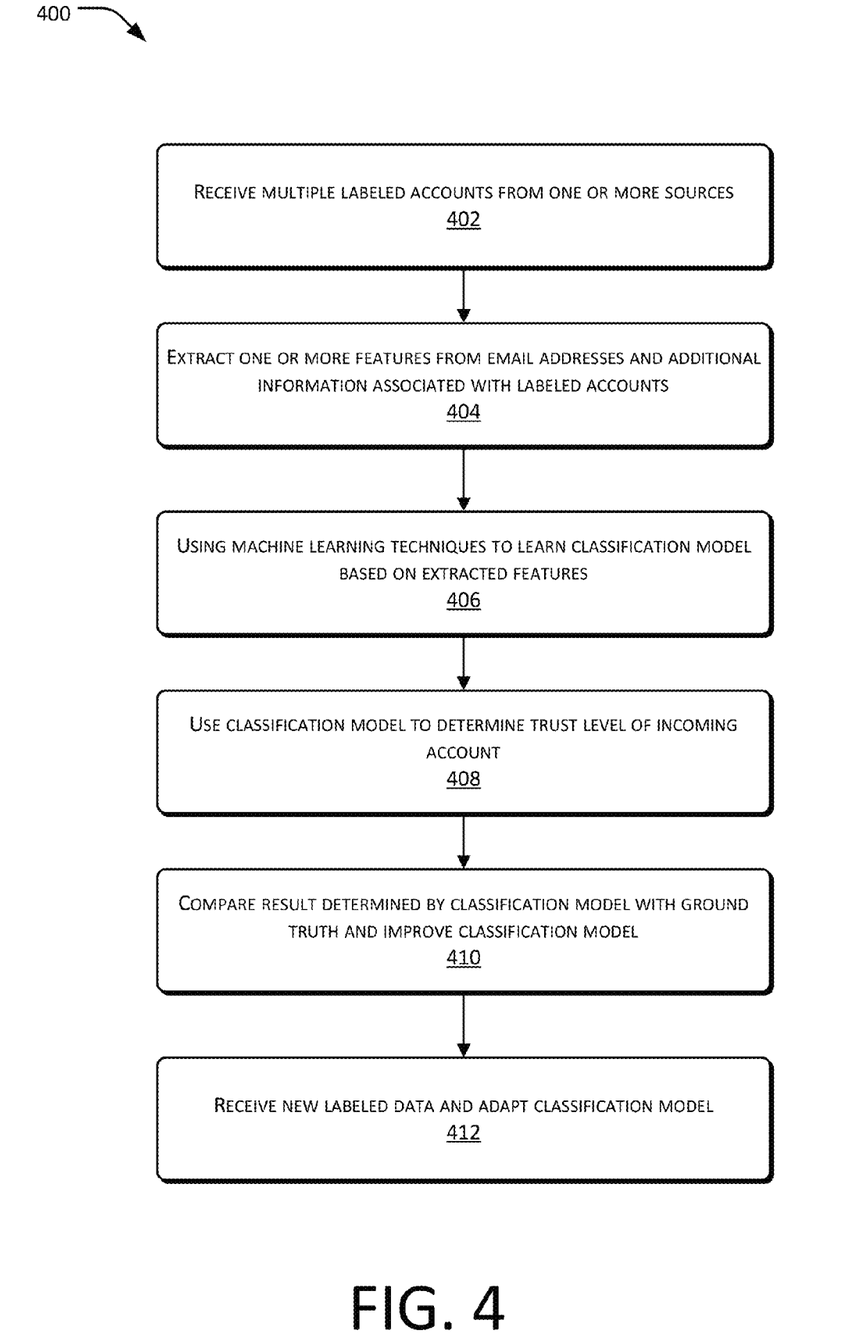
FIG. 4 illustrates a flowchart of an example method for continuously training the classification model.

FIG. 4 illustrates a flowchart of an example method 400 of machine-learning techniques that continuously train the classification model 128.

At 402, multiple labeled accounts from one or more sources are received. Each of the labeled accounts indicates whether the respective labeled account is a malicious account or a benign account. Each account may be associated with an email address and/or additional information.

At 404, one or more features that are used to distinguish malicious accounts from benign accounts are extracted from the plurality of labeled accounts. For example, the computing system 116 may extract one or more features from the email addresses and/or additional information associated with the accounts. The computing system 116 may use the extracted one or more features and the labeling results of the accounts to learn the classification model 128 by using one or more machine learning method. For example, the computing system 116 may use SVM to produce or build the classification model 128. Some features that the computing system 116 extracts from the accounts may be related to memorability of an email address. Additional features may be based on the domains of the email addresses, and/or related to correlation of an email address with the additional information associated with the same account. In addition, features that the computing system 116 extracts from the accounts may be based on the additional information. For example, some features may be based on validity of the name, address, phone number, correlation of the account's information with that of a credit card that has been or is used in one or more online transactions. In addition, the computing system 116 may also modify the threshold value of each feature in determining the trust level of the account.

At 406, the classification model 128 is learned or built by using one or more machine learning techniques based on the extracted features and the labeling results of the accounts. For example, SVM may be used at 406 to produce the classification model 128.

At 408, the classification model 128 is used to determine a trust level of the account 102. In some embodiments, the computed trust level is compared against with one or more thresholds to determine that the account 102 is malicious, benign, or uncertain.

At 410, the result determined by the classification model 128 is compared with the ground truth to improve the classification model 128. For example, the ground truth of accounts may be compared with the results determined by the classification model 128 to incrementally train the classification model 128 so that the classification model 128 is improved. If the ground truth agrees with the result, the classification model 128 and its included features are confirmed. If the ground truth does not agree with the result, the classification model 128 is disconfirmed.

At 412, new labeled data are received and the classification model 128 is adapted incrementally with new labeled accounts. The new labeled data may be either new incoming labeled data or previously labeled data with label changes such that a previously labeled malicious account is labeled benign and vice versa. For example, new labeled accounts may be applied to train the classification model 128 incrementally to adapt to or track changes of the accounts. The computing system 116 may continue to receive new incoming labeled data to adapt the classification model 128.

The following lists some exemplary features that are related to memorability of an email address 104. One or more of these features may be extracted from the email address 104 associated with the account 102 computing system 116. The contribution of each of the following example features to the final computed trust level of the account may be determined by the classification model 128. For example, the features and their respective weights in determining the trust level may be same or different during a period of time and may be added, deleted or modified from the training including improving or adapting of the classification model 128 as described above.

m_EmailAccountLength. This feature represents the number of characters in the email account before the symbol "@" in an email address. After the symbol "@," it is the domain of the email address. For the example of email address xuefei0917@gmail.com, its m_EmailAccountLength is 10. The domain is gmail.com. For the example of email address fkajklfa8971jfjlajfqiu@gmail.com, its m_EmailAccountLength is 22, which is difficult to remember and might be associated with a malicious account. For example, in an event that the number is high, the email address may be created by a machine, and thus the account may be suspicious. The contribution of this feature to the final computed trust level of the account is determined by the classification model 128.

m_NumberMemorableLength. This feature represents the number of total memorable numbers including date, repeated characters, and symmetry, such as 19870919, 123456, 135531. For the example of email address zsf58923@gmail.com, its m_NumberMemorableLength is 0 because "58923" appears non-memorable. In one example, numbers such as dates, symmetry, repeated may be considered to be memorable as a whole (i.e., 100% memorable). For the example of email address zsf123321@gmail.com, its m_NumberMemorableLength is 6, which describes "123321." Note that "123321" is symmetric. In another example, numbers with symmetry may be considered partially memorable. For the example of a string of numbers "378873," the last 3 numbers can be derived from the first three numbers and thus it is assumed that no effort is needed to remember the last 3 numbers. But a person may still need to remember the first three numbers since they appear meaningless (and thus need some effort to remember). Therefore this string of number is considered as 3 memorable digits and 3 unmemorable digits, i.e., 50% memorable. For the same example above, if the address in the additional information 106 contains 378, for example, 378 is part of the zip code of the address, then these three numbers are also considered as memorable, and email address contains 6 memorable digits in this case. In an event that the number or the percentage of memorable numbers is low, the email may tend to be generated by a machine, and the associated account may be suspicious.

m_NumberofLetterStrings. This feature represents the number of separate strings including letters. For the example of email address xuefei0917@gmail.com, its m_NumberofLetterStrings is 1. For the example of email address xf0917zww@gmail.com, its m NumberofLetterStrings is 2, i.e., "xf" and "zwww." For the example of email address f7fa18foa@gmail.com, its m_NumberofLetterStrings is 3, i.e., "f," "fa," and "foa." For example, in an event that the number is high, the account associated with the email address may be suspicious.

m_NumofMemorable. This feature represents the number of memorable sub-strings including letters such as word, name, and etc. For the example of xuefei0917@gmail.com, its m_NumofMemorable is 2 as "xue" and "fei" are both memorable as Chinese spellings. For the example of nicholas@gmail.com, its m_NumofMemorable is 1 as it includes one name "Nicholas" in English. For the example of email address gkjhgfhja@163.com, its m_NumofMemorable is 0 as no words are detected in the email address. For example, in an event that the number is high, the account associated with the email address may be suspicious.

m_LengthofMemorable. The feature represents the total number of characters in the memorable sub-strings including letters. For the example of email address xuefei0917@gmail.com, its m_LengthofMemorable is 6 as the total number of characters in the two memorable letter strings "xue" and "fei" is 6. For the example of email address nicholas.zxy@gmail.com, its m_LengthofMemorable is 8 as the number of characters in the memorable letter string "Nicholas" is 8. For example, in an event that the number is, the account associated with the email address may be suspicious.

m_MemorableRate. This feature represents the memorable rate which is measured as the total number of characters in the memorable letter strings divided by the total number of characters in the email account before the symbol @. For the example of email address xuefei0917@gmail.com, its m_MemorableRate is 1.0 because the whole letter strings is memorable. For the example of email address nicholas.zxy@gmail.com, its m_MemorableRate is 0.727 (i.e., 8/11) as the total number of characters in the memorable letter string is 8 while the total number of characters is 11. For the example of email address gkjhgfhja@163.com, its m MemorableRate is 0 as there is no memorable letter string in the email account. For example, in an event that the number is low, the account associated with the email address may be suspicious.

m_FrontMemorableConfidenceLevel. This feature represents the confidence level in the range from 0 to 1 for the email account that begins with a memorable string. Detailed calculation methods may vary. For the example of email address xuefei0917@gmail.com, its m_FrontMemorableConfidenceLevel is high such as 0.9 because "xue" is judged as a memorable string at the front position. For the example of email address lijffs09@gmail.com, its m_FrontMemorableConfidenceLevel is relatively uncertain such as 0.5 because the starting substring "li" is judged to have a probability of 0.5 to be a memorable string. For example, in an event that the number is low, the account associated with the email address may be suspicious.

m_EndMemorableConfidenceLevel. This feature represents the confidence level in the range from 0 to 1 for the email account that ends with a memorable string. The features may not consider any numbers at the end of the email address. For the example of email address xuefei0917@gmail.com, its m_EndMemorableConfidenceLevel is high such as 0.9 because "fei" is judged as a reasonable string at the end position of letters.

m_MaxLengthofMemorable. This feature represents the number of characters in the longest memorable substring of letters. For the example of email address email address nicholas2leo2ben@gmail.com, its m_MaxLengthofMemorable is 8 as the longest memorable string of letters is "nicholas" which has 8 characters.

m_DistanceBetweenMemorable. This feature represents the largest distance between two memorable sub-strings. For the example of email address xuefei0917@gmail.com, its m_DistanceBetweenMemorable is 0 since there is nothing between the two memorable substrings "xue" and "fei." For the example of jobghjfsdfhtown@gmail.com, its m DistanceBetweenMemorbale is 8 from the word "job" to "town." For example, in an event that the number is high, the account associated with the email address may be suspicious.

m_MaxNonmemorableLength. This feature represents the number of characters in the longest non-memorable string of letters. This differs from the previous feature by considering all non-memorable strings while the previous feature m_DistanceBetweenMemorable considers only the non-memorable strings between memorable strings. For the example of email address xuefei0917@gmail.com, its m_MaxNonmemorableLength is 0 since both letter strings "xue" and "fei" are memorable. For the example of xuefeihhfg0917@gmail.com, its m_MaxNonmemorableLength is 4 for the meaningless letter-string "hhfg." For the example of email address ghfiafsdk@gmail.com, its m_MaxNonmemorableLength is 9 for "ghfiafsdk." For example, in an event that the number is high, the account associated with the email address may be suspicious.

m_LengthofMemorable. The feature represents the total number of characters in the memorable sub-strings including letters. For the example of email address xuefei0917@gmail.com, its m_LengthofMemorable is 6 as the total number of characters in the two memorable letter strings "xue" and "fei" is 6. For the example of email address Nicholas.zxy@gmail.com, its m_LengthofMemorable is 8 as the number of characters in the memorable letter stringer "Nicholas" is 8. For example, in an event that the number is high, the account associated with the email address may be suspicious.

m_NumberofNonmemorable. This feature represents the number of non-memorable strings including letters or numbers in the email address. This feature is different from the m_BreakPoints as the latter doesn't consider the non-memorable substrings composed by numbers. For the example of email address jobs472fhs@gmail.com, its m NumberofNonmemorable is 2 for "472" and "fhs," while its m_BreakPoints is 1 for "fhs." For the example of email address gjh783ffsj04571fua@gmail.com, its m NumberofNonmemorable is 5 for "gjh," "783," "ffsj," "04571," and "fua," while its m_BreakPoints is 0 because it has no memorable strings.

n-gram average and n-gram max. This feature represents the average value of n-gram in the email address. An n-gram is a contiguous sequence of n characters. An n-gram model is a probabilistic language model, which is the conditional probability of the last character xi given the previous (n−1) characters $x_{i-(n-1)}$, $x_{i-(n-2)}$, $x_{i-1}$. The n-gram model can be obtained from a plurality of words, for example, a dictionary. The string of an email before the symbol "@" may be partitioned into a plurality of continues n characters. Each substring of continues n characters is assigned a probability or weight by the n-gram model. The average of these n-gram probabilities is the n-gram average while the maximum value of these n-gram probabilities is the n-gram max. In some embodiments, the n-gram used to determine a trust level of an account may be at least one of a 2-gram, 3-gram, 4-gram, and a 5-gram. For example, the string "trean" in an email address trean@gmail.com is not a word but it has a good performance on n-gram judgment, so that it has a better n-gram average and n-gram max than the random characters such as "ghfjs," "gkjiu," and "tyttt", such as for n=2, 3, 4, or 5.

m_LengthofNumberStrings. This feature represents the length of sub-strings including numbers in the email address. For the example of email address xuefei0917@gmail.com, its m_LengthofNumberStrings is 4 for the sub-string "0917."

m_NumberofNumberStrings. This feature represents the number of separate sub-strings of numbers in the email address. For the example of email address xuefei0917@gmail.com, its m NumberofNumberString is 1 for the sub-string "0917." For the example of email address 48hfh519jhfa7888@gmail.com, its m_NumberofNumber­String is 3 for the sub-strings "48," "519," and "7888."

m_TotalMemorableRate. This feature represents the total memorable rate which is the sum of the length of memorable letter sub-strings and the length of memorable number sub-strings divided by the whole length of the email address. For the example of email address xuefei0917@gmail.com, its m_TotalMemorableRate is 1 because the length of memo­rable letter-strings is 6 for "xuefei," and the length of memo­rable number-string is 4 for "0917" which is interpreted as indicating a date. The total length of the email address is 10. So the total memorable rate is 1 for 10/10. For the example of email address benjamin2786ghhf@gmail.com, its m_To­talMemorbaleRate is 0.5 because the length of memorable letter sub-strings is 8 for 'benjamin', and the length of memo­rable number sub-strings is 0. The total length of the email address is 16. So the total memorable rate is 8/16.

m_NameConfidenceLevel. This feature represents the confidence level that the email address contains a name. The confidence level may be a value between [0, 1]. In general, a human-generated email address may contain a name to indi­cate a user of the email address. For the example of email address Nicholas312@gmail.com, its m_NameConfi­denceLevel is high (about 1) because it has a sub-string "nicholas," which is a name with length of 8 letters. This feature may also consider whether the first letter of the name is capitalized such as the "N" here and a position of the name, and may consider if the name in the additional information 106 or its variations appear in the email address and how likely that name is a valid name. If the name locates at the beginning or end of the email address, the value would be higher. For the example of email address joshfguufsd@gmail.com, its m_NameConfidenceLevel wood not be as high as that of the Nicholas312@gmail.com as it has a higher probability of wrong spelling of name in the email address.

m_DomainNameReliability. This feature represents the reliability score (such as between 0 and 1) of the domain of the email address. A domain in the white list (such as Microsoft.com, ibm.com) is assigned to a high reliability score such as 1, and a domain in the blacklist (such as "m5n.com") is assigned to a low reliability score such as 0. For a domain not in either list, the reliability score is calcu­lated as follows: two additional lists of domains are main­tained, for example, through the labeled data and determina­tion of the new incoming email addresses. A list of benign domains lists a plurality of domains and a count $C_B$ of distinct email addresses for each respective domain that is associated with benign accounts. A list of malicious domains lists a plurality of domains and a count $C_M$ of distinct email address for each respective domain that is associated with malicious accounts. The reliability score may be obtained by formula $(C_B+C)/(C_B+C_M+C)$, where C is a parameter to make the score around 0.5 for small $C_B$ and $C_M$. In other words, when the samples of the $C_B$ and $C_M$ are not large enough, the reliability scores indicates neutral. In another example, the reliability score may be within a range shorter than (0,1) such as (0.3, 0.7) for the reliability score determined by the list of benign domains and the list of malicious domains to make their reliability scores different from those domains in the white list or black list.

When considering the features, the computing system 116 may also use one or more rules to treat certain numbers or letters as other numbers or letters according to conventions and abbreviations. The following is a list of some example conversion rules.

For example, the number "0" may be treated as the letter "o" and vice versa. The number "2" may be treated as the characters "two." The number "4" may be treated as the characters "for." The number "1" may be treated as "i" or "1". Te number 3 may be treated as the letter "e." The number "5" may be treated as the letter "s." The letter "y" may be treated as "i." The number "7" may be treated as the characters "seven." The string "2k" may be treated as "2000." The letter "c" may be treated as the characters "see." The string "im" may be treated as "iam." The string "ezy" may be treated as "ez" or "easy." The string "biz" may be treated as "busy" or "business." The letter "f" or "f4" may be treated as "for." The letter "x" may be treated as the multiplier symbol "*." The string "2b" may be treated as "tobe." The string "nite" may be treated as "night." The string "b4" may be treated as "before." The letter "u" may be treated as "you." The number "8" may be treated as "ate."

For another example, the phrase "xxxst" may be treated as "xxx" street, and the phrase "xxxav" may be treated as "xxx" avenue. The "xxx" here acts as placeholders and refers to any characters. The "007" standards for a famous movie and be treated as a meaningful term. The strings "xx.xx", "xx-xx," and "xx_xx" may be treated as some meaningful numbers connected by ".," -," or "_."

Conclusion

Although the subject matter has been described in lan­guage specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method performed by one or more processors config­ured with computer-executable instructions, the method com­prising:
receiving an account associated with information includ­ing an email address;
extracting one or more features from the information asso­ciated with the account, wherein at least one of the one or more features is based on memorability of the email address, the memorability relating to a pattern of sym­metry, anti-symmetry, or uniformly distanced characters in the email address; and
determining a trust level of the account at least partly based on the extracted features.

2. The method as recited in claim 1, further comprising:
determining that the account is benign if the determined trust level is higher than a first preset threshold; and/or determining that the account is malicious if the determined trust level is lower than the first preset threshold or a second preset threshold that is different from the first preset threshold.

3. The method as recited in claim 1, wherein the at least one of the one or more features comprises one or more features related to meaningful strings in the email address.

4. The method as recited in claim 3, wherein the meaningful strings comprise one or more numbers that are convertible into one or more letters according to a set of rules.

5. The method as recited in claim 1, wherein the at least one of the one or more features comprises one or more features related to pronounceable strings in the email address.

6. The method as recited in claim 1, wherein at least one of the one or more features is based on a domain of the email address.

7. The method as recited in claim 6, further comprising computing a trust level for the domain of the email address using at least one of a white list of domains, a black list of domains, a malicious list of domains, or a benign list of domains, wherein:
the white list of domains includes one or more domains that are assumed to be associated with benign accounts;
the black list of domains includes one or more domains that are assumed to be associated with malicious accounts;
the benign list of domains includes one or more domains and a count for each of the one or more domains that a respective domain is associated with accounts labeled as benign; or
the malicious list of domains includes one or more domains and a count for each of the one or more domains that a respective domain is associated with accounts labeled as malicious.

8. The method as recited in claim 1, wherein:
the information further comprises additional information associated with the account and/or the email address, the additional information including a name, a phone number, an IP address of a source of the request, and/or an address associated with the account and/or the email address; and
at least one of the one or more features is based on the additional information of the account.

9. The method as recited in claim 8, further comprising computing a trust level for the additional information using at least one of a white list of additional information, a black list of additional information, a malicious list of additional information, or a benign list of additional information, wherein:
the white list of additional information includes one or more additional information that are assumed to be associated with benign accounts;
the black list of additional information includes one or more additional information that are assumed to be associated with malicious accounts;
the benign list of additional information includes one or more additional information and a count for each of the one or more additional information that respective additional information is associated with accounts labeled as benign; and
the malicious list of additional information includes one or more additional information and a count for each of the one or more additional information that respective additional information is associated with accounts labeled as malicious.

10. The method as recited in claim 1, wherein the determining the trust level of the account comprises:
analyzing a plurality of labeled accounts from one or more sources, each of the plurality of labeled accounts indicating that a respective labeled account is malicious or benign;
determining one or more features extracted from the plurality of accounts that distinguish a respective labeled account that is malicious and a respective labeled account that is benign;
applying one or more machine learning methods to build a classification model based on the obtained one or more features; and
using the classification model to calculate a score of the trust level of the account.

11. The method as recited in claim 10, wherein the one or more machine learning methods comprise a support vector machine (SVM) method.

12. One or more computing devices having stored thereupon a plurality of computer-executable instructions that, when executed by a processor, causes the processor to perform operations comprising:
analyzing a plurality of labeled accounts from one or more sources, each of the plurality of labeled accounts indicating that a respective labeled account is malicious or benign;
determining one or more features extracted from the plurality of accounts that distinguish a respective labeled account that is malicious and a respective labeled account that is benign, wherein at least one of the one or more features is based on memorability of email addresses, the memorability relating to a pattern of symmetry, anti-symmetry, or uniformly distanced characters in the email address;
applying one or more machine learning methods to build a classification model based on the obtained one or more features; and
using the classification model to determine a trust level of an incoming account.

13. The one or more computing devices as recited in claim 12, wherein one or more of the plurality of labeled accounts are associated with the email addresses.

14. The one or more computing devices as recited in claim 12, wherein the one or more operations further comprise:
comparing the trust level of the incoming account determined by the classification model with a ground truth of the trust level of the incoming account; and
improving the classification model based on a result of the comparison.

15. The one or more computing devices as recited in claim 14, wherein the improving the classification model comprises:
receiving the ground truth of the trust level of the incoming account;
comparing the ground truth with the trust level determined by the classification model to check an accuracy of determination of the classification model; and
training the classification model incrementally at least partly based on a result of comparison.

16. The one or more computing devices as recited in claim 12, wherein the one or more operations further comprise:
receiving one or more new labeled accounts; and
adapting the classification model based on the one or more new labeled accounts.

17. The one or more computing devices as recited in claim 12, wherein the one or more machine learning methods comprise a support vector machine (SVM) method.

18. The one or more computing devices as recited in claim 12, wherein at least one of the one or more features comprises one or more features related to meaningful strings in the email address, and wherein the meaningful strings further comprise one or more numbers that are convertible into one or more letters according to a set of rules.

19. A system comprising:

memory storing one or more modules;

one or more processors operably coupled to the memory to execute one or more modules, the one or more modules including:

a receiving module that receives an account, the account associated with an email address and/or additional information;

a training module that uses one or more labeled data including a plurality of labeled accounts to learn a classification model based on one or more features from email addresses and/or additional information associated with the labeled accounts that distinguish a malicious account from a benign account at least partly based on memorability of the email addresses, the features including at least one of following:

one or more features related to meaningful strings, the meaningful strings including one or more letters or numbers that are convertible according to a set of rules;

one or more features related to pronounceable strings;

one or more features related to a pattern including symmetry, anti-symmetry or uniformly distanced characters in the email address;

one or more features related to a domain of the email address; or one or more features related to additional information associated with the account and/or the email address, the additional information including a name, a phone number, or an address associated with the account and/or the email address; and a determination module that uses the classification model to determine a trust level of the account.

* * * * *